(12) United States Patent
Nyberg et al.

(10) Patent No.: US 12,519,374 B2
(45) Date of Patent: Jan. 6, 2026

(54) STATOR FOR ELECTRIC MACHINE, ELECTRIC MACHINE, VEHICLE, AND METHOD OF ASSEMBLING A STATOR

(71) Applicant: Scania CV AB, Södertälje (SE)

(72) Inventors: Johannes Nyberg, Stockholm (SE); Christian Ness, Nykvarn (SE); Mattias Forslund, Tumba (SE)

(73) Assignee: Scania CV AB, Södertälje (SE)

( * ) Notice: Subject to any disclaimer, the term of this patent is extended or adjusted under 35 U.S.C. 154(b) by 217 days.

(21) Appl. No.: 18/278,232

(22) PCT Filed: Mar. 25, 2022

(86) PCT No.: PCT/SE2022/050291
§ 371 (c)(1),
(2) Date: Aug. 22, 2023

(87) PCT Pub. No.: WO2022/211701
PCT Pub. Date: Oct. 6, 2022

(65) Prior Publication Data
US 2024/0128835 A1    Apr. 18, 2024

(30) Foreign Application Priority Data
Apr. 1, 2021   (SE) .................... 2150417-0

(51) Int. Cl.
*H02K 9/197*   (2006.01)
*H02K 1/16*    (2006.01)
(Continued)

(52) U.S. Cl.
CPC ............... *H02K 9/197* (2013.01); *H02K 1/16* (2013.01); *H02K 15/02* (2013.01); *H02K 15/12* (2013.01)

(58) Field of Classification Search
CPC   H02K 9/197; H02K 9/12; H02K 1/16; H02K 15/02; H02K 15/12
(Continued)

(56) References Cited

U.S. PATENT DOCUMENTS

| 1,543,502 A | 6/1925 | Hobart |
| 2017/0063201 A1 | 3/2017 | Kitta et al. |

(Continued)

FOREIGN PATENT DOCUMENTS

| CN | 110198112 A | * | 9/2019 | ............... H02K 1/20 |
| DE | 102017102141 A1 | * | 8/2018 | ............. H02K 15/00 |

(Continued)

OTHER PUBLICATIONS

SCANIA CV AB, International Patent Application No. PCT/SE2022/050291, International Search Report, Apr. 6, 2022.
(Continued)

*Primary Examiner* — Jose A Gonzalez Quinones
(74) *Attorney, Agent, or Firm* — Moore & Van Allen PLLC; W. Kevin Ransom (57) ABSTRACT

A stator for an electric machine is disclosed. The stator comprises a stator core comprising a number of stator slots extending through an axial end surface of the stator core and a number of wire windings arranged in the stator slots. The stator further comprises a sealing arranged against the axial end surface of the stator core such that the sealing covers at least a section of the axial end surface located radially inside the wire windings. The present disclosure further relates to an electric machine, a vehicle comprising an electric machine, and a method of assembling a stator for an electric machine.

17 Claims, 3 Drawing Sheets

(51) Int. Cl.
*H02K 15/02* (2025.01)
*H02K 15/12* (2025.01)

(58) Field of Classification Search
USPC .............................................. 310/52, 54, 58
See application file for complete search history.

(56) References Cited

U.S. PATENT DOCUMENTS

| | | | |
|---|---|---|---|
| 2017/0310189 A1 | 10/2017 | Hanumalagutti et al. | |
| 2018/0109170 A1 | 4/2018 | Park et al. | |

FOREIGN PATENT DOCUMENTS

| | | | | |
|---|---|---|---|---|
| DE | 102017222635 A1 | * | 6/2019 | ............... H02K 1/20 |
| DE | 102019117373 A1 | * | 12/2020 | |
| EP | 1241773 6 | | 9/2012 | |
| EP | 2518865 A1 | | 10/2012 | |
| FR | 2840122 A | | 11/2003 | |
| FR | 2840122 A1 | * | 11/2003 | ............... H02K 3/24 |
| GB | 164114 A | | 6/1921 | |
| GB | 165046 A | | 3/1922 | |
| GB | 2500040 5 | | 9/2013 | |
| GB | 2500040 A | * | 9/2013 | ............... H02K 9/19 |
| JP | 3741031 B2 | | 2/2006 | |
| WO | 2016150683 A1 | | 9/2016 | |
| WO | 2020214074 A1 | | 10/2020 | |

OTHER PUBLICATIONS

SCANIA CV AB, International Patent Application No. PCT/SE2022/050291, Written Opinion, Apr. 6, 2022.
SCANIA CV AB, International Patent Application No. PCT/SE2022/050291, International Preliminary Report on Patentability, Oct. 3, 2023.
SCANIA CV AB, European Patent Application No. 22781748.3, Extended European Search Report, Jan. 27, 2025.

* cited by examiner

STATOR FOR ELECTRIC MACHINE, ELECTRIC MACHINE, VEHICLE, AND METHOD OF ASSEMBLING A STATOR

CROSS-REFERENCE TO RELATED APPLICATIONS

This application is a National Stage Patent Application (filed under 35 § U.S.C. 371) of PCT/SE2022/050291, filed Mar. 25, 2022, of the same title, which, in turn claims priority to Swedish Patent Application No. 2150417-0 filed Apr. 1, 2021, of the same title; the contents of each of which are hereby incorporated by reference.

TECHNICAL FIELD

The present disclosure relates to a stator for an electric machine. The present disclosure further relates to an electric machine, a vehicle comprising an electric machine, and a method of assembling a stator for an electric machine.

BACKGROUND

The use of electric drive for vehicles provides many advantages, especially regarding local emissions. Such vehicles comprise one or more electric machines configured to provide motive power to the vehicle. These types of vehicles can be divided into the categories pure electric vehicles and hybrid electric vehicles. Pure electric vehicles, sometimes referred to as battery electric vehicles, only-electric vehicles, and all-electric vehicles, comprise a pure electric powertrain and comprise no internal combustion engine and therefore produce no emissions in the place where they are used.

A hybrid electric vehicle comprises two or more distinct types of power, such as an internal combustion engine and an electric propulsion system. The combination of an internal combustion engine and an electric propulsion system provides advantages with regard to energy efficiency, partly because of the poor energy efficiency of an internal combustion engine at lower power output levels. Moreover, some hybrid electric vehicles are capable of operating in pure electric drive when wanted, such as when driving in certain areas.

An electric machine is a machine that converts electrical energy into mechanical energy and vice versa. Most electric machines comprise magnets and wire windings, wherein the electric machine operate through the interaction between the magnetic field of the magnets and electric current in the wire windings to generate force in the form of rotation of a rotor of the electric machine. Also, some electric motors comprise wire windings as an alternative to magnets or in addition to magnets. The rotor is usually surrounded by a stator. Some electric machines comprise magnets in the rotor and wire windings in the stator and some other electric machines comprise wire windings in the rotor and magnets in the stator. However, for vehicle applications, the most common is that electric machines comprise wire windings in the stator and magnets and/or wire windings in the rotor.

During operation of an electric machine, heat is generated in components thereof, especially in wire windings and the like components of the electric machine for example because of resistive losses therein. Many advantages can be obtained by cooling the wire windings with a coolant system comprising a liquid coolant, such as oil or an aqueous/glycol mixture. As examples, by cooling the wire windings with a coolant system, overheating of the electric machine can be avoided and the operational reliability of the electric machine can be improved. Moreover, by using a coolant system comprising a liquid coolant, the wire windings can be cooled in an efficient and homogenous manner causing lower variations in temperature at different portions of the wire windings.

However, coolant systems for electric machines are also associated with some problems and drawbacks. One problem with stators which comprises a coolant system with a liquid coolant is to encapsule the liquid coolant inside the stator. If the liquid coolant is leaking into a rotor compartment of the electric machine, the liquid coolant may cause significant drag losses and unbalances of the rotor. Moreover, electric machines usually operate in demanding environments with a lot of vibration, high rotational speeds, and high temperature variations which add to the problem of encapsuling liquid coolant inside the stator.

Different types of wire windings exist, such as random wound wires, hairpin wires, form wound wires, and the like. The different types of wire windings have different advantages and disadvantages when it comes to the design of the stator core, durability, and the complexity and costs of the manufacturing and assembling of an electric machine. In contrast to hairpin wires, form wound wires is a type of continuous wire winding which can reduce the need for welding during an assembling procedure. However, form wound wires put requirements on the design of a stator core.

Furthermore, generally, on today's consumer market, it is an advantage if products, such as electric motors and their associated components, systems, and arrangements have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a stator for an electric machine. The stator comprises a stator core comprising a number of stator slots extending through an axial end surface of the stator core and a number of wire windings arranged in the stator slots. The stator further comprises a sealing arranged against the axial end surface of the stator core such that the sealing covers at least a section of the axial end surface located radially inside the wire windings.

Since the stator comprises a sealing arranged against the axial end surface of the stator core such that the sealing covers at least a section of the axial end surface located radially inside the wire windings, conditions are provided for efficiently sealing the axial end surface of the stator core against a stator housing so as to efficiently encapsule a liquid coolant inside the stator.

In this manner, the stator can be cooled in an efficient and homogenous manner causing lower variations in temperature at different portions of the wire windings. Moreover, leakage of liquid coolant past the sealing can be avoided so as to avoid drag losses of a rotor of an electric machine comprising the stator.

Accordingly, a stator is provided overcoming, or at least alleviating, at least some of the above-mentioned problems and drawbacks. As a result, the above-mentioned object is achieved Optionally, the stator is configured to induce a torque to a rotor of the electric machine to rotate the rotor around a rotation axis, and wherein the sealing is substantially flat and extends in a plane perpendicular to the rotation axis. Thereby, conditions are provided for a further efficient seal of the axial end surface of the stator core so as to efficiently avoid leakage to a rotor compartment of an electric machine comprising the stator.

Optionally, the sealing comprises a number of protrusions each protruding into a respective area between two adjacent wire windings. Thereby, a stator is provided having conditions for being assembled in a cost-efficient manner. This is because the sealing can be attached, oriented, and fixated to the axial end surface of the stator core in a simpler manner.

Optionally, the sealing covers at least a section of the axial end surface located between a radially inner delimiting surface of the stator core and a radially inner delimiting surface of the wire windings. Thereby, conditions are provided for a further efficient seal of the axial end surface of the stator core so as to efficiently avoid leakage to a rotor compartment of an electric machine comprising the stator.

Optionally, the wire windings are continuous wire windings or form wound windings. Thereby, a stator is provided having conditions for being manufactured and assembled in a cost-efficient manner. This is because the need for welding is reduced after arranging the wire windings in the stator slots. Moreover, a durable and reliable stator can be provided.

Optionally, the stator comprises a coolant system configured to accommodate a coolant, and wherein the sealing is arranged to prevent flow of coolant out of the coolant system. Thereby, the stator can be cooled in an efficient and homogenous manner causing lower variations in temperature at different portions of the wire windings while ensuring an efficient seal of the axial end surface of the stator core. In this manner, leakage of liquid coolant past the sealing can be avoided so as to avoid drag losses of a rotor of an electric machine comprising the stator.

Optionally, the stator comprises a sealing holding member configured to hold the sealing against the axial end surface by abutting against the sealing. Thereby, a stator is provided having conditions for being manufactured and assembled in a cost-efficient manner. This is because the sealing can be attached and fixated to the axial end surface of the stator core in a simpler and more efficient manner.

Optionally, the sealing holding member is configured to hold the sealing against the axial end surface by abutting against one or more protrusions of the number of protrusions. Thereby, a sealing holding member is provided capable of holding the sealing against the axial end surface in a simple and efficient manner so as to facilitate manufacturing and assembling of the stator. Moreover, the sealing holding member may not impair the sealing capacity of the sealing.

Optionally, the sealing holding member is attached to the stator in an interface between a stator slot and a wire winding arranged in the stator slot. Thereby, a stator is provided having conditions for being manufactured and assembled in a cost-efficient manner. Moreover, the sealing holding member may not impair the sealing capacity of the sealing.

Optionally, the sealing holding member is formed by impregnation. Thereby, a stator is provided having conditions for being manufactured and assembled in a cost-efficient manner. Moreover, the material of the sealing holding member may not cause any reduction in the electrical performance of the stator.

Optionally, the sealing comprises a porous material. Thereby, a sealing is provided having conditions for absorbing an impregnating resin during manufacture and assembly of the stator. In this manner, the sealing can be sealingly attached to the axial end surface of the stator core in a simple, efficient, and reliable manner. In addition, as a further result thereof, the sealing efficiency of the sealing can be improved.

Optionally, the sealing comprises a fibrous material. Thereby, a sealing is provided having conditions for absorbing an impregnating resin during manufacture and assembly of the stator. In this manner, the sealing can be sealingly attached to the axial end surface of the stator core in a simple, efficient, and reliable manner. In addition, as a further result thereof, the sealing efficiency of the sealing can be improved. Moreover, due to the fibrous material, a durable sealing can be provided.

Optionally, the sealing comprises a paper material. Thereby, a simple and low-cost sealing is provided having conditions for absorbing an impregnating resin during manufacture and assembly of the stator. In this manner, the sealing can be sealingly attached to the axial end surface of the stator core in a simple, efficient, and reliable manner. In addition, as a further result thereof, a high sealing efficiency of the sealing can be obtained.

Optionally, the sealing comprises a first and a second layer, and wherein the first layer comprises an absorbing material and the second layer comprises a non-absorbing material. Thereby, conditions are provided for sealingly attaching the sealing to the axial end surface of the stator core in a simple, efficient, and reliable manner by arranging the first layer against the axial end surface of the stator core while providing conditions for a further improved the sealing efficiency of the sealing by arranging the non-absorbing material of the second layer in abutting contact with a gasket, or the like.

Optionally, the first layer comprises a porous material and the second layer comprises a polymeric material. Thereby, conditions are provided for sealingly attaching the sealing to the axial end surface of the stator core in a simple, efficient, and reliable manner by arranging the porous material of the first layer against the axial end surface of the stator core while providing conditions for a further improved the sealing efficiency of the sealing by arranging the polymeric material of the second layer in abutting contact with a gasket, or the like.

Optionally, a surface of the first layer faces the axial end surface of the stator core. Thereby, it can be ensured that the sealing can be sealingly attached to the axial end surface of the stator core in a simple, efficient, and reliable manner.

Optionally, the sealing comprises a pre-impregnated porous material, or a pre-impregnated fibrous material. Thereby, the need for impregnating the sealing upon assembling and manufacturing of the stator is circumvented, or at least reduced.

Optionally, the first layer of the sealing comprises a pre-impregnated porous material, or a pre-impregnated fibrous material. Thereby, it can be ensured that a porous/fibrous first layer is impregnated even in embodiments in which the second layer comprises a non-absorbing material, such as a non-porous polymeric material. That is, in embodiments in which the second layer of the sealing comprises a non-absorbing material it can be difficult to impregnate the first layer because transport of impregnating resin may become blocked by the second layer. However, according to these embodiments, since the first layer of the sealing comprises a pre-impregnated porous material, or a pre-impregnated fibrous material, it can be ensured that a porous/fibrous first layer is impregnated after manufacturing and assembling of the stator.

Optionally, the stator comprises a stator housing mounted to the stator such that a flange of the stator housing faces the sealing. Thereby, an efficient seal of the interface between the axial end surface of the stator core and the flange of the stator housing can be ensured. As a further result thereof, conditions are provided for cooling the stator in an efficient and homogenous manner while avoiding leakage of a liquid coolant into a rotor compartment of an electric machine comprising the stator.

Optionally, the stator comprises a gasket arranged between the sealing and the flange of the stator housing. Thereby, a further efficient seal of the interface between the axial end surface of the stator core and the flange of the stator housing can be ensured. As a further result thereof, conditions are provided for cooling the stator in an efficient and homogenous manner while further avoiding leakage of a liquid coolant into a rotor compartment of an electric machine comprising the stator.

Optionally, the gasket comprises an elastomer. Thereby, a further efficient seal of the interface between the axial end surface of the stator core and the flange of the stator housing can be ensured. As a further result thereof, conditions are provided for cooling the stator in an efficient and homogenous manner while further avoiding leakage of a liquid coolant into a rotor compartment of an electric machine comprising the stator.

According to a second aspect of the invention, the object is achieved by an electric machine comprising a rotor and a stator according to some embodiments of the present disclosure.

Since the electric machine comprises a stator according to some embodiments, the electric machine provides conditions for efficiently sealing the axial end surface of the stator core of the stator against a stator housing so as to efficiently encapsule a liquid coolant inside the stator.

In this manner, the stator of the electric machine can be cooled in an efficient and homogenous manner causing lower variations in temperature at different portions of the wire windings of the stator. Moreover, leakage of liquid coolant past the sealing can be avoided so as to avoid drag losses of the rotor of the electric machine.

Accordingly, an electric machine is provided overcoming, or at least alleviating, at least some of the above-mentioned problems and drawbacks. As a result, the above-mentioned object is achieved.

According to a third aspect of the invention, the object is achieved by a vehicle comprising an electric machine according to some embodiments of the present disclosure. Since the vehicle comprises an electric machine according to some embodiments, a vehicle is provided overcoming, or at least alleviating, at least some of the above-mentioned problems and drawbacks. As a result, the above-mentioned object is achieved.

According to a fourth aspect of the invention, the object is achieved by a method of assembling a stator for an electric machine. The method comprises the steps of:
 providing a stator core comprising a number of stator slots extending through an axial end surface of the stator core,
 inserting a number of wire windings into the stator slots, and
 arranging a sealing against the axial end surface of the stator core such that the sealing covers at least a section of the axial end surface located radially inside the wire windings.

Since the method comprises the step of arranging a sealing against the axial end surface of the stator core such that the sealing covers at least a section of the axial end surface located radially inside the wire windings, the method provides conditions for efficiently sealing the axial end surface of the stator core against a stator housing so as to subsequently efficiently encapsule a liquid coolant inside the stator.

In this manner, the stator of the electric machine can be cooled in an efficient and homogenous manner causing lower variations in temperature at different portions of the wire windings of the stator. Moreover, leakage of liquid coolant past the sealing can be avoided so as to avoid drag losses of the rotor of the electric machine.

Accordingly, a method is provided overcoming, or at least alleviating, at least some of the above-mentioned problems and drawbacks. As a result, the above-mentioned object is achieved.

Optionally, the method further comprises the step of:
 applying an impregnating resin onto the stator after the step of arranging the sealing against the axial end surface of the stator core.

Thereby, a method is provided having conditions for sealingly attaching the sealing to the axial end surface of the stator core in a simple, efficient, and reliable manner. This because the impregnating resin may upon hardening attach the sealing to the axial end surface in an efficient and reliable manner.

Optionally, the method further comprises the step of:
 mounting a stator housing to the stator such that a flange of the stator housing faces the sealing.

Thereby, an efficient seal of the interface between the axial end surface of the stator core and the flange of the stator housing can be ensured. As a further result thereof, conditions are provided for cooling the stator in an efficient and homogenous manner while avoiding leakage of a liquid coolant into a rotor compartment of an electric machine comprising the stator.

Optionally, the method further comprises the step of:
 arranging a gasket onto the sealing before the step of mounting the stator housing to the stator.

Thereby, a further efficient seal of the interface between the axial end surface of the stator core and the flange of the stator housing can be ensured. As a further result thereof, conditions are provided for cooling the stator in an efficient and homogenous manner while further avoiding leakage of a liquid coolant into a rotor compartment of an electric machine comprising the stator.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
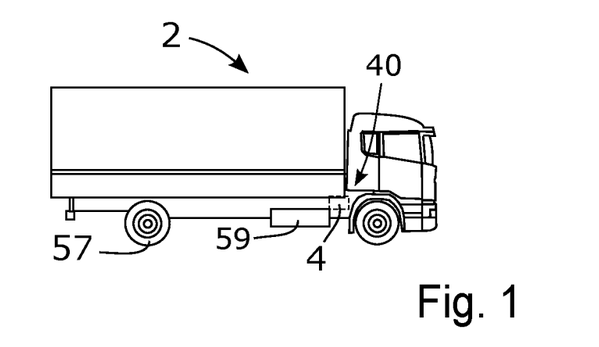
FIG. 1 illustrates a vehicle according to some embodiments.

FIG. 1 illustrates a vehicle 2 according to some embodiments. According to the illustrated embodiments, the vehicle 2 is a truck, i.e. a type of heavy vehicle. According to further embodiments, the vehicle 2, as referred to herein, may be another type of heavy or lighter type of manned or unmanned vehicle for land or water based propulsion such as a lorry, a bus, a construction vehicle, a tractor, a car, a ship, a boat, or the like.

The vehicle 2 comprises an electric powertrain 40. According to the illustrated embodiments, the electric powertrain 40 is configured to provide motive power to the vehicle 2 via wheels 57 of the vehicle 2. The electric powertrain 40 comprises an electric machine 4. The electric machine 4 is capable of providing motive power to the vehicle 2 via wheels 32 of the vehicle 2 as well as providing regenerative braking of the vehicle 2. Thus, according to the illustrated embodiments, the electric machine 4 is capable of operating as an electric motor as well as an electric generator. The electric machine 4 of the vehicle 2 may also be referred to as a vehicle propulsion motor/generator 4.

According to the illustrated embodiments, the electric powertrain 40 of the vehicle 2 is a pure electric powertrain 40, i.e. a powertrain comprising no internal combustion engine. According to further embodiments, the electric powertrain 40 of the vehicle 2 may be a so called hybrid electric powertrain 40 comprising a combustion engine in addition to the electric machine 4 for providing motive power to the vehicle 2.

Moreover, in FIG. 1, a propulsion battery 59 of the vehicle 2 is indicated. The propulsion battery 59 is operably connected to the electric machine 4 and is configured to provide electricity thereto and/or receive electricity therefrom. The propulsion battery 59 may comprise a number of battery cells, such as lithium-ion battery cells, lithium polymer batteries cells, or nickel-metal hydride battery cells.

Figure 2:
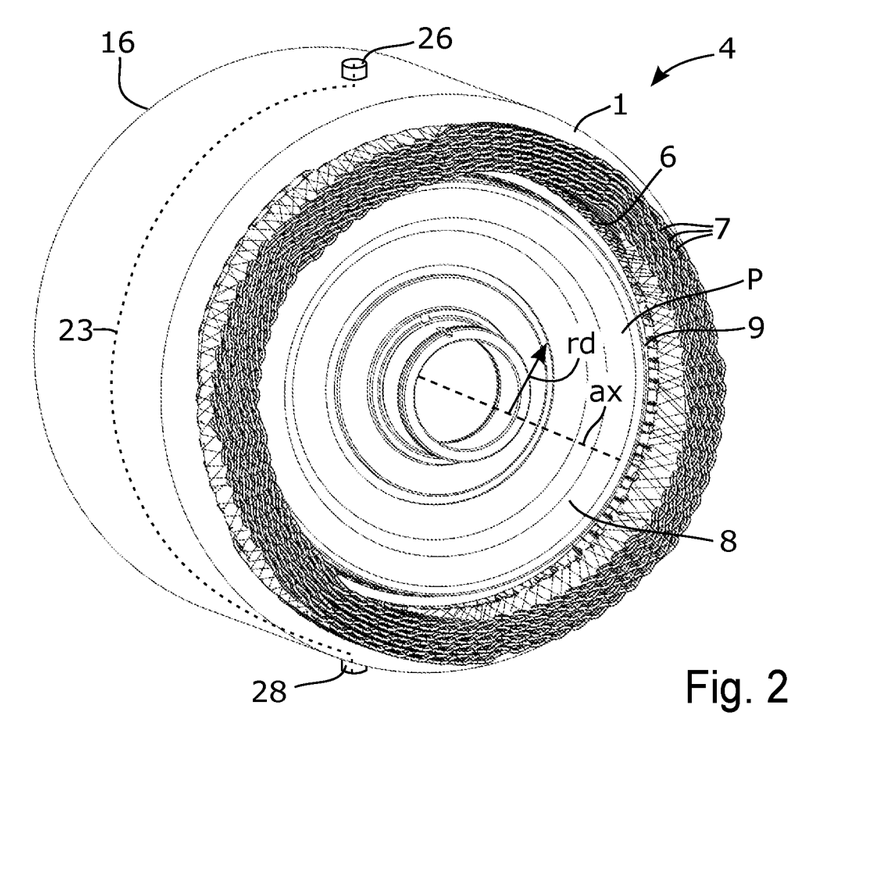
FIG. 2 illustrates an electric machine of an electric powertrain of the vehicle illustrated in FIG. 1.

FIG. 2 illustrates the electric machine 4 of the electric powertrain 40 of the vehicle 2 illustrated in FIG. 1. The electric machine 4 comprises a stator 1 and a rotor 8. The stator 1 is configured to induce a torque to the rotor 8 of the electric machine 4 to rotate the rotor 8 around a rotation axis ax. As seen in FIG. 2, according to the illustrated embodiments, the rotor 8 is arranged inside the stator 1.

As seen in FIG. 2, the stator 1 comprises a number of wire windings 7. As is further explained herein, the wire windings 7 are arranged in stator slots of a stator core of the stator 1. The stator 1 also comprises a stator housing enclosing the wire windings 7. The stator housing is not illustrated in FIG. 1 for reasons of clarity and visibility. According to the illustrated embodiments, the wire windings 7 are continuous wire windings. In more detail, according to the illustrated embodiments, the wire windings 7 are form wound wires. Form wound wires is a type of pre-shaped continuous wire winding which may require no welding during an assembling procedure of the stator 1, as is further explained herein. The wire windings 7, as referred to herein, may also be referred to as coil wire windings 7.

In embodiments where the electric machine 4 operates as an electric motor, an electric current fed through the wire windings 7 generates a magnetic field inducing a torque causing rotation of the rotor 8 around the rotation axis ax. In embodiments where the electric machine 4 operates as an electric generator, an electric current is generated in the wire windings 7 from a magnetic field of the magnets of the rotor 8 upon rotation of the rotor 8 around the rotation axis ax. Thus, in such embodiments, and in such situations, the stator 1 induces a torque to the rotor 8 braking the rotation of the rotor 8 around the rotation axis ax. The stator 1 is thus configured to induce, i.e. apply, a torque to a rotor 8 of an electric machine 4 by the interaction between a magnetic field of the stator 1 and a magnetic field of the rotor 8. The induced torque may be a torque causing rotation of the rotor 8 or a torque braking rotation of the rotor 8, as explained above.

The stator 1 comprises a coolant system 23 configured to accommodate a coolant. The coolant may be a liquid coolant such as oil or an aqueous/glycol mixture. The coolant system 23 comprises a coolant inlet 26, a coolant outlet 28, and coolant channels fluidly connecting the coolant inlet 26 to the coolant outlet 28. An external cooling system may be connected to the coolant inlet 26 and to the coolant outlet 28 and may pump coolant through the coolant system 23 of the stator 1 in a direction from the coolant inlet 26 towards the coolant outlet 28. During operation of the electric machine 4, the coolant is heated, and the heated coolant may be cooled by such an external cooling system using a heat dissipating unit, such as a radiator.

In FIG. 2, a radial direction rd of the electric machine 4 is indicated. The radial direction rd of the electric machine 4 is perpendicular to the rotation axis ax of the rotor 8 of the electric machine 4. The radial direction rd of the electric machine 4 coincides with a radial direction rd of the rotor 8 as well as with a radial direction rd of the stator 1. The stator core of the stator 1 comprises a first axial end surface 6 and a second axial end surface 16. The second axial end surface 16 is opposite to the first axial end surface 6. According to the illustrated embodiments, the first and second axial end surfaces 6, 16 have identical but mirrored design. Therefore, in the following, the features, functions, and advantages of one of the first and second axial end surfaces 6, 16 of the stator 1 is explained, namely the first axial end surface 6 indicated in FIG. 2, which herein is referred to as "the axial end surface 6" of the stator core of the stator 1.

Figure 3:
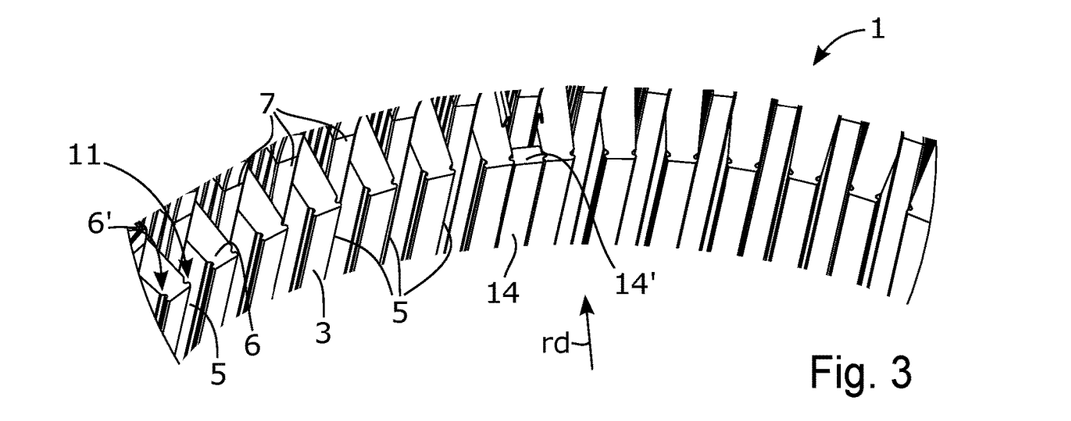
FIG. 3 illustrates an enlarged view of a section of a stator of the electric machine according to the embodiments illustrated in FIG. 2.

FIG. 3 illustrates an enlarged view of a section of a stator 1 of an electric machine 4 according to the embodiments illustrated in FIG. 2. In FIG. 3, the stator core 3 of the stator 1 is indicated and the axial end surface 6 of the stator core 3 can be clearly seen. Below, simultaneous reference is made to FIG. 2 and FIG. 3, if not indicated otherwise. The stator core 3 may be formed by an electro plate laminate comprising a plurality of thin plates stacked and attached to each other. The stator core 3 comprises a number of stator slots 5 extending through the axial end surface 6 of the stator core 3. The stator slots 5 are circumferentially distributed on the stator core 3. As seen in FIG. 3, the wire windings 7 are arranged in the stator slots 5. The stator slots 5 also extends through the second axial end surface 16 of the stator core 3 indicated in FIG. 2. Thereby, the wire windings 7 can be inserted into the stator slots 5 in a simple and efficient manner when assembling the stator 1, as is further explained herein.

In FIG. 3, a slot wedge 14 is indicated. The slot wedge 14 is a rod-shaped body inserted in a stator slots 5 via openings 11 of the stator slots 5 at the axial end surface 6. In FIG. 3, one slot wedge 14 is illustrated. However, the stator 1 may comprise a slot wedge 14 arranged in each stator slot 5 of the stator 1. As understood from the herein described, slot wedges 14 may also be inserted into the stator slots 5 via openings of the stator slots 5 at the second axial end surface 16 of the stator core 3. The slot wedges 14 have substantially the same length as the length of the stator core 3 measured in an axial direction of the stator 1 between the first and second end surfaces 6, 16. The axial direction of the stator 1 is parallel to the rotation axis of a rotor of an electric machine comprising the stator 1. The slot wedges 14 are arranged radially inside the wire windings 7 and may be configured to retain the wire windings 7 in the stator slots 5.

Figure 4:
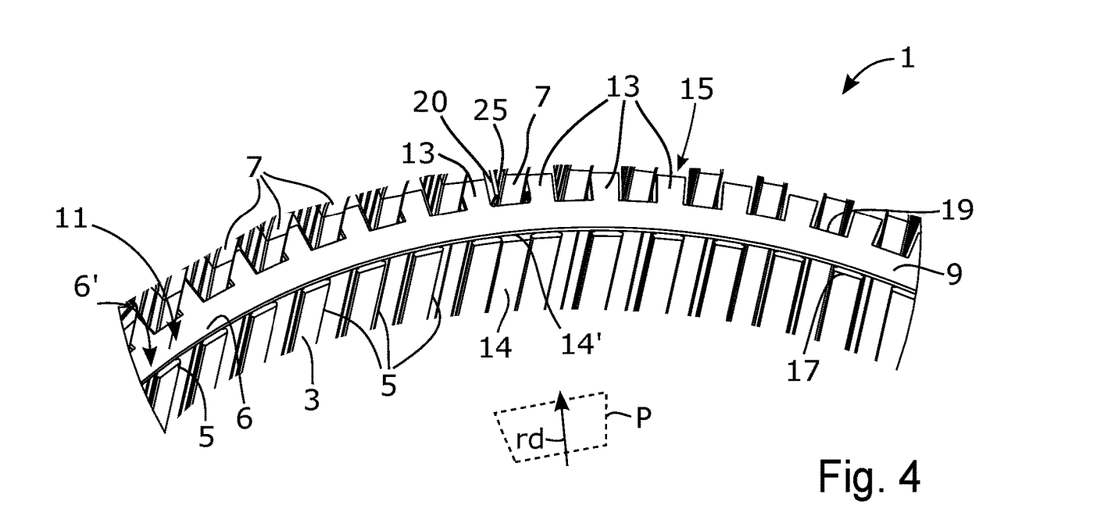
FIG. 4 illustrates the section of the stator illustrated in FIG. 3 where a sealing is arranged against an axial end surface of a stator core of the stator, FIG. 5 schematically illustrates a cross section through a stator according to some embodiments.

FIG. 4 illustrates the section of the stator 1 illustrated in FIG. 3 where a sealing 9 is arranged against the axial end surface 6 of a stator core 3 of the stator 1. The sealing 9 is also seen and indicated in FIG. 2. Below, simultaneous reference is made to FIG. 2-FIG. 4, if not indicated otherwise. The sealing 9 is arranged against the axial end surface 6 of the stator core 3 such that the sealing 9 covers at least a section 6' of the axial end surface 6 located radially inside the wire windings 7.

Due to these features, conditions are provided for efficiently sealing the axial end surface 6 of the stator core 3 against a stator housing so as to efficiently encapsule a coolant of the coolant system 23 indicated in FIG. 2 inside the stator 1. Thus, according to the illustrated embodiments, the sealing 9 is arranged to prevent flow of coolant out of the coolant system 23. In this manner, the stator 1 can be cooled in an efficient and homogenous manner causing low variations in temperature at different portions of the wire windings 7. Moreover, leakage of liquid coolant past the sealing 9 can be avoided so as to avoid drag losses of the rotor 8 of the electric machine 4.

According to the illustrated embodiments, the sealing 9 is substantially flat and extends in a plane P perpendicular to the rotation axis ax of the rotor 8 of an electric machine 4 comprising the stator 1. Moreover, according to the illustrated embodiments, the sealing 9 is ring-shaped and is arranged against the axial end surface 6 of the stator core 3 such that the sealing 9 covers the entire circumference of a section of the axial end surface 6 located radially inside the wire windings 7. The plane P is indicated in FIG. 2 and FIG. 4. The plane P is parallel to the radial direction rd of the stator 1. The feature that the sealing 9 is substantially flat means that the sealing 9 is substantially planar. All physical objects extend in three extension directions, wherein the three extension directions are perpendicular to each other. However, the feature that the sealing 9 is substantially flat means that the sealing 9 has considerable larger dimensions in a first and in a second extension direction than in a third extension direction, wherein the first, second and third extension directions are perpendicular to each other, and wherein the thickness of the sealing 9 can be measured in the third extension direction.

Accordingly, the feature that the sealing 9 extends in the plane P perpendicular to the rotation axis ax means that the first and second extension directions of the sealing 9 are perpendicular to the rotation axis ax and that the third extension direction, i.e. the direction in which the thickness of the sealing 9 can be measured, is perpendicular to the radial direction rd of the stator 1. In other words, the third extension direction of the sealing 9 is parallel to the axial direction of the stator 1 when the sealing 9 is arranged against the axial end surface 6 of the stator core 3 of the stator 1. Thus, as understood from the above described, according to the illustrated embodiments, the sealing 9 has larger dimensions in the radial direction rd and in a circumferential direction of the sealing 9 than in directions parallel to the rotation axis ax, when the sealing 9 is arranged against the axial end surface 6 of the stator core 3 of the stator 1.

According to the illustrated embodiments, the sealing 9 covers a section 6' of the axial end surface 6 of the stator core 3 located between a radially inner delimiting surface 17 of the stator core 3 and a radially inner delimiting surface 19 of the wire windings 7. The radially inner delimiting surface 17 of the stator core 3 may be defined as the delimiting surface of the stator core 3, at the axial end surface 6, located closest to the rotation axis ax of a rotor 8 of an electric machine comprising the stator 1. Likewise, the radially inner delimiting surface 19 of the wire windings 7 may be defined as the delimiting surface of the wire windings 7, at a region of the axial end surface 6, located closest to the rotation axis ax of a rotor 8 of an electric machine comprising the stator 1.

As understood from the above described, the stator core 3 extends to the axial end surface 6 of the stator core 3. The sealing 9 may be in abutting contact with the axial end surface 6 of the stator core 3. Moreover, the sealing 9 may be arranged against axial end surfaces 14' of slot wedges 14 arranged in the stator slots 5 and may cover at least sections of the axial end surfaces 14' of slot wedges 14. Moreover, the sealing 9 may be in abutting contact with the axial end surfaces 14' of slot wedges 14. Furthermore, according to some embodiments, the sealing 9 may cover at least part of openings 11 of stator slots 5 at the axial end surface 6.

According to the illustrated embodiments, the sealing 9 comprises a number of protrusions 13. Each protrusion 13 protrudes into a respective area 15 between two adjacent wire windings 7. As understood of the herein described, the number of areas 15 between two adjacent wire windings 7 is the same number as the number of circumferentially distributed stator slots 5 of the stator 1. Due to the protrusions 13 of the sealing 9, the sealing 9 can be attached, oriented, and fixated to the axial end surface 6 of the stator core 3 in a simpler manner upon assembly of the stator 1.

In addition, according to the illustrated embodiments, the stator 1 comprises a sealing holding member 20 configured to hold the sealing 9 against the axial end surface 6 by abutting against the sealing 9. Due to the sealing holding member 20, the sealing 9 can be attached and fixated to the axial end surface 6 of the stator core 3 in a further simpler and more efficient manner. According to the illustrated embodiments, the sealing holding member 20 is configured to hold the sealing 9 against the axial end surface 6 by abutting against one or more protrusions 13 of the number of protrusions 13. Moreover, as indicated in FIG. 4, according to the illustrated embodiments, the sealing holding member 20 is attached to the stator 1 in an interface 25 between a stator slot 5 and a wire winding 7 arranged in the stator slot 5. According to some embodiments, the sealing holding member 20 may be formed by impregnation protruding out of the interface 25 between a stator slot 5 and a wire winding 7, as indicated in FIG. 4. Thereby, the material of the sealing holding member 20 may not have a negative impact on the electrical performance of the stator 1.

The sealing 9 may comprise at least one of a porous material, a fibrous material, and a paper material. A porous material is a material having minute interstices through which liquid or air may pass and/or accumulate. A fibrous material is a porous material comprising fibres. A paper material is a fibrous material manufactured in sheets from the pulp of wood or other fibrous substances. Each of a porous material, a fibrous material, and a paper material is thus an absorbing material because the material has minute interstices through which liquid or air may pass and/or accumulate.

Components of an electric machine 4, such as components of a stator 1 of an electric machine 4, are usually impregnated using a liquid impregnating resin. The liquid impregnating resin may be applied onto the components using various methods including spraying, trickling, Vacuum Pressure Impregnation (V.P.I), dipping of various types/methods, potting, and submerging the entire component in liquid impregnating resin. Trickling is a method in which the component is rotated and tricked with resin. Vacuum Pressure Impregnation (V.P.I) is a method in which the component is completely submerged in a resin and through a combination of dry and wet vacuum and pressure cycles, the resin is assimilated.

The various methods of impregnating involve a hardening step in which the impregnating resin is hardened. Impregnation is used to protect the components from damage, wear, and corrosion and to electrically insulate the components. Moreover, impregnation can increase the thermal conductivity of the components so as to facilitate cooling of the components.

As understood from the above, in embodiments in which the sealing 9 comprises absorbing material such as a porous material, a fibrous material, or a paper material, the sealing can absorb the impregnating resin. In this manner, the sealing 9 can be sealingly attached to the axial end surface 6 of the stator core 3 in a simple and efficient manner. Thus, as understood from the above, according to embodiments herein, the sealing 9 may be arranged onto the axial end surface 6 of the stator core 3 before the stator 1 is impregnated.

Figure 5:
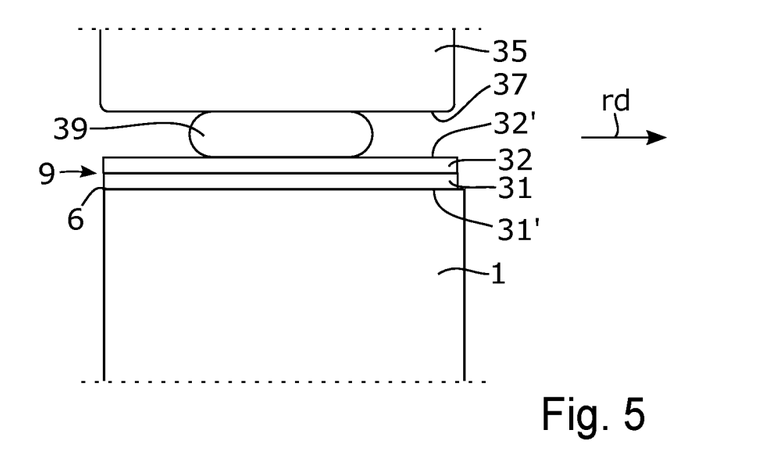

FIG. 5 schematically illustrates a cross section through a stator 1 according to some embodiments. In FIG. 5, the cross section is made in a plane comprising the radial direction rd of the stator 1. The stator 1 may be a stator 1 according to the embodiments explained with reference to FIG. 2-FIG. 4. Therefore, in the following, simultaneous reference is made to FIG. 2-FIG. 5, if not indicated otherwise. In FIG. 5, a stator housing 35 of the stator 1 is illustrated. As can be seen in FIG. 5, the stator housing 35 mounted to the stator 1 such that a flange 37 of the stator housing 35 faces the sealing 9. The stator housing 35 is configured to enclose the wire windings 7 indicated in FIG. 2-FIG. 4 and may encapsule a liquid coolant of the coolant system 23 indicated in FIG. 2 inside the stator 1. The stator housing 35 may comprise a polymeric material and may be attached to the stator 1 using one or more fastening elements, such as bolts, screws, or the like.

According to the illustrated embodiments, the stator 1 comprises a gasket 39. The gasket 39 is arranged between the sealing 9 and the flange 37 of the stator housing 35 and is in abutting contact with the sealing 9 and with the flange 37. Thereby, a further efficient seal of the interface between the axial end surface 6 of the stator core 3 and the flange 37 of the stator housing 35 can be ensured. As a further result thereof, leakage of a liquid coolant into a rotor compartment of an electric machine comprising the stator 1 can be further avoided. The gasket 39 may be ring shaped and may be a type of O-ring. According to the illustrated embodiments, the gasket 39 has a diameter matching the diameter of the sealing 9, and thus also a diameter matching the diameter of the axial end surface 6 of the stator core 3 radially inside the wire windings 7. The gasket 39 may comprise an elastomer.

According to the embodiments illustrated in FIG. 5, the sealing 9 comprises a first and a second layer 31, 32. According to these embodiments, the first layer 31 comprises an absorbing material and the second layer 32 comprises a non-absorbing material. A non-absorbing material is herein defined as a material lacking minute interstices through which liquid or air may pass or accumulate. According to some embodiments, the first layer 31 comprises a porous material and the second layer 32 comprises a non-absorbing polymeric material. As understood from the herein described, a porous material, a fibrous material, and a paper material may also comprise a polymeric material.

According to the embodiments illustrated in FIG. 5, a surface 31' of the first layer 31 faces the axial end surface 6 of the stator core 3. In this manner, the sealing 9 can adhere to the axial end surface 6 of the stator core 3 when impregnation is absorbed in the first layer 31. Moreover, as seen in FIG. 5, a surface 32' of the second layer 32 faces the gasket 39. In this manner, because the second layer 32 comprises a non-absorbing polymeric material according to the illustrated embodiments, a tight and reliable seal is provided between the gasket 39 and the sealing 9.

According to some embodiments, the sealing 9 comprises a pre-impregnated porous material, or a pre-impregnated fibrous material. The feature that a material is pre-impregnated means that the material is impregnated before the sealing 9 is arranged against the axial end surface 6 of the stator core 3. According to some embodiments, the first layer 31 of the sealing 9 comprises a pre-impregnated porous material, or a pre-impregnated fibrous material, and the second layer 32 of the sealing 9 comprises a non-absorbing polymeric material. In this manner, it can be ensured that a porous/fibrous first layer 31 is impregnated even in embodiments in which the second layer 32 comprises a non-absorbing material, such as a non-porous polymeric material. That is, in embodiments in which the second layer 32 of the sealing 9 comprises a non-absorbing material it can be difficult to impregnate the first layer 31 because transport of impregnating resin may become blocked by the second layer 32 of the sealing 9. However, according to these embodiments, since the first layer 31 of the sealing 9 comprises a pre-impregnated porous material, or a pre-impregnated fibrous material, it can be ensured that the porous/fibrous first layer 31 of the sealing 9 is impregnated.

Figure 6:
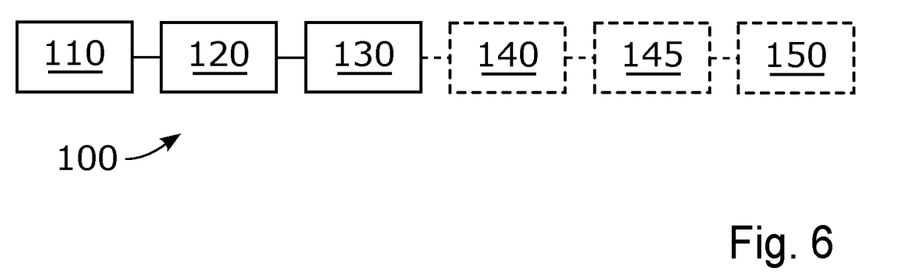
FIG. 6 illustrates a method of assembling a stator for an electric machine.

FIG. 6 illustrates a method 100 of assembling a stator for an electric machine. The stator may be a stator 1 according to the embodiments explained with reference to FIG. 2-FIG. 5. Therefore, below, simultaneous reference is made to FIG. 2-FIG. 6, if not indicated otherwise. The method 100 of assembling the stator 1 for the electric machine 4 comprises the steps of:

providing 110 a stator core 3 comprising a number of stator slots 5 extending through an axial end surface 6 of the stator core 3, inserting 120 a number of wire windings 7 into the stator slots 5, and arranging 130 a sealing 9 against the axial end surface 6 of the stator core 3 such that the sealing 9 covers at least a section 6' of the axial end surface 6 located radially inside the wire windings 7.

The steps of inserting 120 the number of wire windings 7 into the stator slots 5 and arranging 130 the sealing 9 against the axial end surface 6 of the stator core 3 may be performed by an assembler or an assembling machine. Obviously, the step of arranging 130 the sealing 9 against the axial end surface 6 of the stator core 3 is performed after the step of inserting 120 the number of wire windings 7 into the stator slots 5.

As indicated in FIG. 4, the method 100 may further comprise the step of:

applying 140 an impregnating resin onto the stator 1 after the step of arranging 130 the sealing 9 against the axial end surface 6 of the stator core 3.

The step of applying 140 the impregnating resin onto the stator 1 may be performed by an assembler or an assembling machine for example using one or more of the methods spraying, trickling, Vacuum Pressure Impregnation (V.P.I), dipping of various types/methods, potting, and submerging the entire stator 1 in liquid impregnating resin.

Moreover, as indicated in FIG. 4, the method 100 further comprises the step of:

mounting 150 a stator housing 35 to the stator 1 such that a flange 37 of the stator housing 35 faces the sealing 9.

The step of mounting 150 the stator housing 35 to the stator 1 may be performed by an assembler or an assembling machine. The step of mounting 150 the stator housing 35 to the stator 1 may be performed after the step of applying 140 the impregnating resin onto the stator 1.

Furthermore, as indicated in FIG. 4, the method 100 further comprises the step of:

arranging 145 a gasket 39 onto the sealing 9 before the step of mounting 150 the stator housing 35 to the stator 1.

The step of mounting 150 a stator housing 35 to the stator 1 may be performed by an assembler or an assembling machine.

As mentioned above, according to the illustrated embodiments, the first and second axial end surfaces 6, 16 of the stator core 3 have identical but mirrored design. Moreover, the stator 1 may comprise a second sealing arranged against the second axial end surface 16 of the stator 1 such that the second sealing covers at least a section of the second axial end surface 16 located radially inside the wire windings 7. Such a second sealing may comprise the same features, functions, and advantages as the sealing 9 explained with reference to FIG. 2-FIG. 6.

As explained herein, the purpose of the gasket 39 is to seal the interface between the axial end surface 6 of the stator core 3 and the flange 37 of the stator housing 35. The gasket 39, as referred to herein, may also be referred to as a sealing. Likewise, according to some embodiments, the sealing 9, as referred to herein, may also be referred to as a gasket.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A stator for an electric machine, wherein the stator comprises:
   a stator core, said stator core extending in an axial direction and comprising a number of stator slots extending through an axial end surface of the stator core;
   a number of wire windings arranged in the stator slots; and
   a sealing arranged against the axial end surface of the stator core and extending in a plane perpendicular to the axial direction extension of the stator core, such that the sealing covers at least a section of the axial end surface located radially inside the wire windings.

2. The stator according to claim 1, wherein the stator is configured to induce a torque to a rotor of the electric machine to rotate the rotor around a rotation axis, and wherein the sealing is substantially flat and extends perpendicular to the rotation axis.

3. The stator according to claim 1, wherein the sealing comprises a number of protrusions each protruding into a respective area between two adjacent wire windings.

4. The stator according to claim 1, wherein the sealing covers at least a section of the axial end surface located between a radially inner delimiting surface of the stator core and a radially inner delimiting surface of the wire windings.

5. The stator according to claim 1, wherein the stator comprises a coolant system configured to accommodate a coolant, and wherein the sealing is arranged to prevent flow of coolant out of the coolant system.

6. The stator according to claim 1, wherein the stator comprises a sealing holding member configured to hold the sealing against the axial end surface by abutting against the sealing.

7. The stator according to claim 6, wherein the sealing holding member is attached to the stator in an interface between a stator slot and a wire winding arranged in the stator slot.

8. The stator according to claim 1, wherein the sealing comprises at least one of a porous material, a fibrous material, and a paper material.

9. The stator according to claim 1, wherein the sealing comprises a first and a second layer, and wherein the first layer comprises an absorbing material and the second layer comprises a non-absorbing material.

10. The stator according to claim 9, wherein the first layer comprises a porous material and the second layer comprises a polymeric material.

11. The stator according to claim 9, wherein a surface of the first layer faces the axial end surface of the stator core.

12. The stator according to claim 1, wherein the sealing comprises a pre-impregnated porous material, or a pre-impregnated fibrous material.

13. The stator according to claim 1, wherein the stator comprises a stator housing mounted to the stator such that a flange of the stator housing faces the sealing.

14. An electric machine comprising:
    a stator, said stator comprising:
       a stator core, said stator core extending in an axial direction and comprising a number of stator slots extending through an axial end surface of the stator core;
       a number of wire windings arranged in the stator slots; and
       a sealing arranged against the axial end surface of the stator core and extending in a plane perpendicular to the axial direction extension of the stator core, such that the sealing covers at least a section of the axial end surface located radially inside the wire windings.

15. A vehicle comprising an electric machine, which comprises a stator, said stator comprising:
    a stator core, said stator core extending in an axial direction and comprising a number of stator slots extending through an axial end surface of the stator core;

a number of wire windings arranged in the stator slots; and a sealing arranged against the axial end surface of the stator core and extending in a plane perpendicular to the axial direction extension of the stator core, such that the sealing covers at least a section of the axial end surface located radially inside the wire windings.

16. A method of assembling a stator for an electric machine, comprising the steps of:

providing a stator core, said stator core extending in an axial direction and comprising a number of stator slots extending through an axial end surface of the stator core;

inserting a number of wire windings into the stator slots; and arranging a sealing against the axial end surface of the stator core where the seal extends in a plane perpendicular to the axial direction extension of the stator core, such that the sealing covers at least a section of the axial end surface located radially inside the wire windings.

17. The method according to claim 16, wherein the method further comprises the step of:

applying an impregnating resin onto the stator after the step of arranging the sealing against the axial end surface of the stator core.

* * * * *